United States Patent [19]

Emslander et al.

[11] Patent Number: 4,962,000
[45] Date of Patent: Oct. 9, 1990

[54] MICROWAVE ABSORBING COMPOSITE

[75] Inventors: Jeffrey O. Emslander, Oakdale, Minn.; Curtis L. Larson, Hudson, Wis.; Pierre H. Lepere, Cottage Grove, Minn.

[73] Assignee: Minnesota Mining and Manufacturing Company, St. Paul, Minn.

[21] Appl. No.: 349,897

[22] Filed: May 5, 1989

Related U.S. Application Data

[63] Continuation of Ser. No. 109,226, Oct. 15, 1987, abandoned.

[51] Int. Cl.$^5$ .............................................. B32B 15/08
[52] U.S. Cl. .............................. 428/461; 219/10.55 E; 99/451; 426/107; 426/234; 428/304.4; 428/34.2; 428/35.7
[58] Field of Search ................ 219/10.55 E; 426/107, 426/234; 99/451; 428/457, 461, 34.2, 35.7, 304.4

[56] References Cited

U.S. PATENT DOCUMENTS

| | | |
|---|---|---|
| 2,875,435 | 2/1959 | McMillan . |
| 4,038,660 | 7/1977 | Connolly et al. . |
| 4,190,757 | 2/1980 | Turpin et al. ................ 219/10.55 E |
| 4,196,331 | 4/1980 | Leveckis et al. ............ 219/10.55 E |
| 4,230,924 | 10/1980 | Bradstad et al. ............ 219/10.55 E |
| 4,267,420 | 5/1981 | Brastad ........................ 426/107 X |
| 4,268,738 | 5/1981 | Flautt, Jr. et al. ....... 219/10.55 E X |
| 4,283,427 | 8/1981 | Winters et al. . |
| 4,327,364 | 4/1982 | Moore . |
| 4,495,392 | 1/1985 | Derby .......................... 219/10.55 E |
| 4,641,005 | 3/1987 | Seiferth ....................... 219/10.55 E |
| 4,656,325 | 4/1987 | Keefer .......................... 426/107 X |
| 4,676,857 | 6/1987 | Schaar et al. ........... 219/10.55 E X |
| 4,702,963 | 10/1987 | Phillips et al. ................. 426/107 X |
| 4,713,510 | 12/1987 | Quick et al. ................. 219/10.55 E |

FOREIGN PATENT DOCUMENTS 2046060 11/1980 United Kingdom .

OTHER PUBLICATIONS

R. Bruce Holmgren, "Susceptors in Packages Improves Microwaving", Jul. 1987, pp. 120-122; Thomas Rosenkranz, "The Technology of Microwave Absorbing Materials for Microwave Packaging", Aug. 31, 1987.
"Microwave Interaction with Thin Multiple Conductive Coatings", Victor M. Martin, Report No. RADC-TR-83-62, United States Air Force Academy, Mar. 1983, pp. 1-7, 29-37.
"An Introduction to Radar Absorbant Materials (RAM)," P. G. Lederer, Report No. 85016, Royal Signals and Radar Establishment, Jul. 21, 1986, pp. 3-8, 19-24, 37-43.

*Primary Examiner*—Edith Buffalow
*Attorney, Agent, or Firm*—Donald M. Sell; Walter N. Kirn; David L. Weinstein

[57] ABSTRACT

Microwave absorbing composite comprising at least two zones of material capable of absorbing microwave energy, each set of said two zones being separated by one zone of material transparent to or transmissive of microwave energy. The microwave energy absorbing zones are selected such that the composite is incapable of arcing in a microwave oven whereof the maximum power output does not exceed 2000 watts at a frequency of 2.45 GHz.

The composite of this invention can be used for such purposes as crisping, browning, or otherwise heating food products, as a material for packaging, or as a package venting material.

24 Claims, 2 Drawing Sheets

MICROWAVE ABSORBING COMPOSITE

This is a continuation of application Ser. No. 07/109,226 filed Oct. 15, 1987, now abandoned.

BACKGROUND OF THE INVENTION

1. Field of the Invention

This invention relates to articles that are capable of absorbing microwave energy. These articles are commonly referred to as susceptors.

2. Discussion of the Prior Art

It is well-known that thin metallic coatings borne on a polymeric sheet will generate heat when placed in a standard microwave oven.

U.S. Pat. No. 4,190,757 discloses a food package composed of a paperboard carton and a lossy microwave energy absorber which becomes hot when exposed to microwave radiation. The absorber is associated in conductive heat transfer relationship with a food product contained in the package and is usually bonded to a structural supporting sheet. The package also includes a shield, e.g., a metal foil sheet adapted to reduce by a controlled amount the direct transmission of microwave energy into the food product. The absorber heats the adjacent surface of the food by conduction to a sufficiently high temperature to provide searing or browning while controlled microwave exposure heats the inside.

U.S. Pat. No. 4,230,924 discloses a food package including a flexible wrapping sheet of dielectric material, such as polyester or paperboard, capable of conforming to at least a portion of the article of food's shape. The dielectric wrapping sheet has a flexible metallic coating thereon, such as aluminum, in the form of a relatively thin film or relatively thick foil subdivided into a number of individual metallic islands or pads separated by criss-crossing non-metallic gaps provided by exposed dielectric strips on the wrapping sheet. When the food package is placed in a microwave oven, some of the microwave energy passes through the wrapping sheet so as to dielectrically heat the food item, but a lesser amount of the microwave energy is converted into thermal energy by the metallic coating so as to brown or crispen that portion of the food adjacent thereto.

U.S. Pat. No. 4,267,240 discloses a food package of plastic film or other dielectric substrate having a very thin coating thereon which absorbs the microwave energy when the package is placed within a conventional microwave oven. The plastic film or other substrate and its coating conform to a substantial surface portion of the food item. The coated plastic film or other substrate converts some of the microwave energy into heat which is transmitted directly to the surface portion of the food so that a browning and/or crispening is achieved.

In the case of susceptors employing thin metal coatings on a polymeric substrate, only a certain amount of heating can be achieved with a given metal before it begins to arc and destroy the polymeric sheet as well as the metallic coating itself. Arcing may also adversely affect the oven, and in some circumstances may even result in a fire.

For metallized films, there is a certain metal thickness that results in maximum microwave heating without arcing. This optimum metal thickness depends on a number of factors such as the nature of the metal itself, the uniformity of the metallic coating, the amount of oxygen and other impurities in the coating, and surface characteristics of the film substrate. Due to these factors, arcing may occur at the film thickness required for optimum heating. Thus, the arcing phenomenon may limit the amount of heat capable of being safely generated from a given single layer construction.

SUMMARY OF THE INVENTION

This invention provides a microwave absorbing composite, also commonly referred to as a susceptor, comprising at least two zones of material capable of absorbing microwave energy, each set of said two zones being separated by one zone of material transparent to or transmissive of microwave energy. The composite must be incapable of arcing in a microwave oven whereof the maximum power output does not exceed 2000 watts at a frequency of 2.45 GHz.

A layer of adhesive, e.g. a pressure-sensitive adhesive, can be used as a zone of microwave transparent material itself or to bond a microwave absorbing zone to a microwave transparent zone that does not have adhesive characteristics. A layer of adhesive can also be used to bond the composite to a package or other article.

The major advantage of the composite of this invention is that the composite can absorb significantly more microwave energy from such sources as a microwave oven without undergoing arcing than can a susceptor having only a single microwave absorbing zone. The composite can therefore develop heat at a faster rate, without arcing, when employed as a microwave susceptor than can a susceptor having only a single microwave absorbing zone.

The microwave absorbing composite can be used for crisping, browning, or otherwise heating food products. The microwave absorbing composite can be used as a packaging material, e.g. package walls, or package insert. The microwave absorbing composite can, in addition, be used as a package venting material.

DETAILED DESCRIPTION

Figure 1:
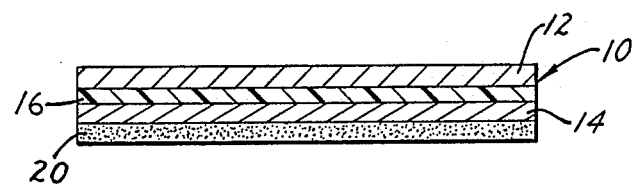
FIG. 1 is a sectional view of one embodiment of the composite of this invention.

Referring now to FIG. 1, which depicts a preferred embodiment of the invention, microwave absorbing composite 10 comprises two zones 12, 14 comprising material capable of absorbing microwave energy, one zone 16 comprising material transparent to or transmissive of microwave energy, and one layer 20 of adhesive applied to microwave absorbing layer 12. However, layer 20 is optional, and the composite of this invention can operate satisfactorily without a layer of adhesive applied thereon.

As used herein, the phrase "capable of absorbing microwave energy" means capable of interacting with microwave energy so as to transform the microwave energy into infrared radiation or sensible heat. A material capable of absorbing microwave energy preferably has a dissipation factor of greater than about 0.5 when tested in accordance with ASTM D 150 at a frequency of 1 GHz. The phrase "transparent to or transmissive of microwave energy" means not wholly absorptive of microwave energy, thereby allowing transmission of such energy. A material transparent to and transmissive of microwave energy preferably has a dissipation factor of less than about 0.5, more preferably less than about 0.2, when tested in accordance with ASTM D 150 at a frequency of 1 GHz. As used herein, the term "zone" means a region or area set off as distinct from adjoining parts whether having a sharp interfacial boundary or a gradual change. For example, a microwave energy absorbing zone can comprise one or more layers of material capable of absorbing microwave energy and a zone of material transparent to or transmissive of microwave energy can comprise one or more layers of insulative material.

Microwave energy absorbing zones 12, 14 can be formed of layers of electrically conductive material. A layer of electrically conductive material can be made of a single metal, a mixture of metals, an oxide of a metal, a mixture of oxides of metals, a dispersion of conductive metallic or non-metallic materials in a binder, or any combination of the foregoing. Metals that are suitable for the conductive layer include aluminum, iron, tin, tungsten, nickel, stainless steel, titanium, magnesium, copper, and chromium. Metal oxides that are suitable for use in the conductive layer include aluminum oxide, iron oxide, and tin oxide. Materials that are not electrically conductive, e.g. aluminum oxide, can only be used in conjunction with electrically conductive material. Materials that are suitable for dispersions include carbon black, graphite, powdered metals, and metal whiskers. The conductive metallic layer can be applied to a layer of material transparent to microwave energy by means of such processes as evaporative vacuum deposition, sputtering, ion plating, and electroplating.

In general, microwave energy absorbing zones 12, 14 can be designed to be sufficiently thin to prevent arcing, and sufficiently thick to absorb sufficient microwave energy for the intended purpose of composite 10. For example, if the microwave absorbing composite is to be used for heating, zones 12, 14 must be sufficiently thick to provide sufficient thermal energy to heat the surface of the product undergoing exposure to microwave energy. When formed from an electrically conductive material, the thickness of the microwave energy absorbing zone can vary from 10 to 1000 Angstroms for deposited metals, 200 to 2000 Angstroms for metal/metal oxide deposits, and 0.1 to 25 mils for conductive dispersions. However, it is preferred that the resistivity of each of the electrically conductive zones be greater than about 30 ohms per square in order to prevent arcing or the development of concentrated hot spots which could cause excessive scorching, burning, or melting of the package or its contents, alarm the user, or damage the microwave heating apparatus.

The shielding effects of the multi-zone construction allow combinations of metallic layers to be used without arcing even though some of the layers would arc if used individually. However, the microwave energy absorbing zones must be prepared in such a way that the composite will be incapable of arcing in a microwave oven whereof the maximum output does not exceed 2000 watts at a frequency of 2.45 GHz.

The resistivity at which arcing occurs can vary with the material of the microwave energy absorbing zone. For example, evaporative vacuum deposited aluminum has been observed to arc at resistivities less than 30 ohms per square, evaporative vacuum deposited stainless steel has been observed to arc at resistivities less than 250 ohms per square, uniform dispersions have been observed to arc at resistivities less than 100 ohms per square, nonuniform dispersions have been observed to arc at overall resistivities greater than several hundred ohms per square.

The following guidelines can generally be used to prepare microwave energy absorbing zones:

| Material | Thickness | Resistivity (ohms/sq.) |
|---|---|---|
| Vacuum deposited metal | 10–1000 Å | 40–600 |
| Vacuum deposited metal oxide | 20–2000 Å | 100–2000 |
| Vacuum deposited alloys | 10–1500 Å | 40–2000 |
| Conductive dispersion | 0.1–25 mil | 200–4000 |

The microwave energy absorbing zones interact with the electric and/or magnetic components of the microwave energy. A portion of the microwave energy falling on a specific microwave energy absorbing zone is reflected, a portion transmitted through the zone, and a portion absorbed by the zone—the absorbed energy being converted into heat. If $Z_a$ represents the impedance of the microwave energy absorbing zone and $Z_o$ the impedance of the medium through which the microwave energy strikes the microwave energy absorbing zone, the reflection factor for the microwave energy absorbing zone is given by the equation:

$$R = (Z_a - Z_o)/(Z_a + Z_o).$$

Thus, for minimum reflection (maximum absorption), the impedance of the microwave energy absorbing zone should equal that of the medium through which the incident microwave energy approaches. In general, a microwave energy absorbing zone absorbs a maximum amount of microwave energy when its impedance matches that of the adjacent medium through which the microwave energy is incident. For example, if a single microwave energy absorbing zone is struck by microwave energy contacting it through air, the impedance of the microwave energy absorbing zone should theoretically be 377 ohms per square, the impedance of free space, for optimum absorption to occur.

In composites having more than one microwave energy absorbing zone, each microwave energy absorbing zone converts microwave energy into heat in proportion to the amount of microwave energy absorbed.

Although there is no theoretical limit as to the number of microwave energy absorbing zones that can be contained in the composite of this invention, practical considerations, e.g, cost, size, typically limit the maximum number of microwave energy absorbing layers to ten or fewer.

Zone 16 acts to separate microwave energy absorbing zones 12, 14. Because zone 16 is transparent to microwave energy, it does not contribute significantly to the overall microwave heating capability of composite 10. In fact, since zone 16 has mass and specific heat capacity, it acts as a thermal load on the overall heating of composite 10, tending to reduce the overall heat output thereof.

Zone 16 is preferably made of an electrically insulative material, e.g. a polymeric film, which can be oriented or unoriented. Materials that have been found to be useful in the present invention for zone 16 include polyolefins, polyesters, polyamides, polyimides, polysulfones, polyether ketones, cellophanes, and blends of the foregoing. Zone 16 can also be made of other electrically nonconductive materials, e.g. paper and laminates comprising paper, aluminum oxide, sodium silicate, cellulosics, e.g. nitrocellulose and zinc sulfide. A portion of zone 16 can comprise gaps consisting of air. If the material of zone 16 is sufficiently thick, it can provide support to microwave energy absorbing zones 12, 14.

Layers of adhesive can be used to adhere a microwave energy absorbing zone to a zone transparent to microwave energy. A layer of adhesive can also be disposed between two microwave energy absorbing zones. By this means, the adhesive layer itself can function as the zone of material transparent to microwave energy. It is preferred that the adhesive have sufficient thermal stability to prevent zones to which it is adhered from separating or curling during the operation of the microwave absorbing composite.

It is preferred that the adhesive that comprises optional adhesive layer 20 maintain adequate physical properties at temperatures up to about 450° F. It is also preferred that the adhesive of layer 20 have sufficient tack to adhere composite 10 to substrates on initial contact. As composite 10 heats in response to microwave energy, the adhesive of layer 20 preferably maintains sufficient mechanical strength to overcome any distortion forces so that composite 10 does not curl or slip relative to the substrate to which it is adhered.

It is preferred to use pressure-sensitive adhesives for adhesive layer 20. Pressure-sensitive adhesives that have been found to be useful in the present invention include silicone-based adhesives, e.g. polysiloxanes, acrylic-based adhesives, e.g. isooctyl acrylate/acrylic acid copolymers, rubber-based adhesives, e.g. styrene-isoprene-styrene block copolymers, styrene-butadiene-styrene block copolymers, and nitrile rubbers, e.g. acrylonitrile-butadiene.

Figure 2:
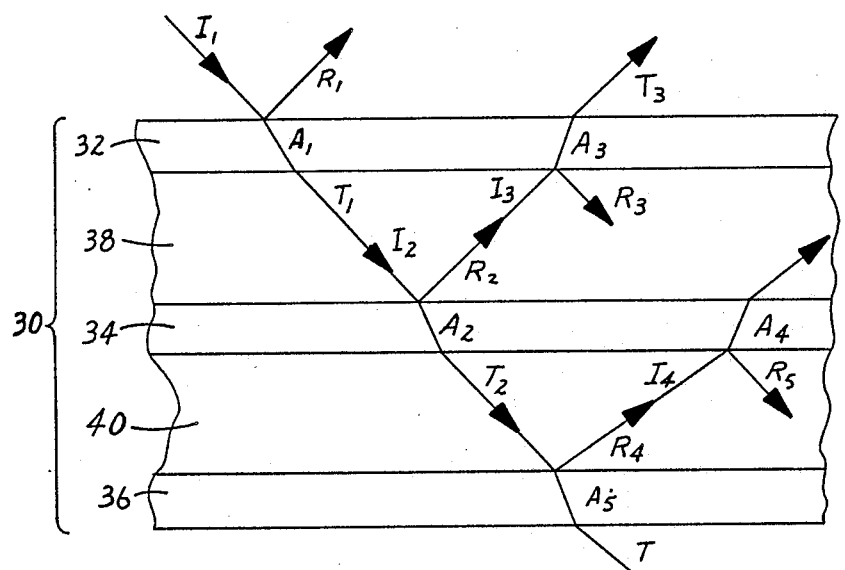
FIG. 2 is a schematic diagram showing how incident, reflected, and transmitted waves travel through the composite of this invention.

The major advantage of the compoisite of this invention is that the composite can absorb significantly more microwave energy from sources of microwave energy, e.g. a microwave oven, without undergoing arcing than can a susceptor having only a single microwave absorbing zone, even if that single zone contains as much microwave energy absorbing material as does the composite. While not wishing to be bound by any theory, it is believed that the invention provides its unexpected advantages due to reflections of the microwave energy at the interface of microwave energy absorbing zones and the zones transparent to microwave energy. Referring now to FIG. 2, composite 30 comprises three microwave energy absorbing zones 32, 34 and 36, and two zones 38 and 40 that are transparent to microwave energy. At first microwave energy absorbing zone 32, a portion of the incident microwave energy ($I_1$) is reflected ($R_1$) by microwave energy absorbing zone 32, a portion absorbed ($A_1$) and converted into heat, and a portion transmitted ($T_1$). This microwave energy transmitted through first microwave energy absorbing zone 32 becomes the incident energy ($I_2$) for second microwave energy absorbing zone 34 for which a portion is reflected ($R_2$), a portion absorbed ($A_2$), and a portion transmitted ($T_2$). This continues on for the number of microwave energy absorbing zones, e.g. zone 36, employed in composite 30. It must also be noted that the energy reflected from second microwave energy absorbing zone 34 ($R_2$) becomes incident on first microwave energy absorbing zone 32 ($I_3$) for which a portion is again absorbed ($A_3$), reflected ($R_3$), and the remainder transmitted ($T_3$). As can be seen, the multiple-zone construction is capable of creating more overall microwave energy absorption (and subsequent heating) than a single-zone construction. However, because of the shielding effects of the zones (i.e. $I_1 > I_2 > I_3$, etc.) there is a limit to the effectiveness of the multiple-zone structure with respect to microwave heating, depending on the balance of transmission, absorption, and reflection for a given material. Another factor contributing to the overall heat output of the multiple-zone construction is the thermal mass associated with each zone. Part of the heat developed by each microwave energy absorbing zone goes into heating the thermal mass of the non-absorbing components 38, 40 of composite 30 (e.g. adhesive layers, zones transparent to microwave energy). In effect, the thinner the non-absorbing components 38, 40 of composite 30, the less their thermal mass and the more efficient the total heat production of composite 30.

The following, non-limiting examples further illustrate the present invention.

EXAMPLE 1

This example demonstrates the relative heating effects of composites having up to 10 layers of microwave absorbing material. Effectiveness was determined by recording the temperature rise of a thermal load provided by two polycarbonate blocks which are placed above and below the composite.

Tape was prepared by first vacuum depositing aluminum onto one major surface of 1 mil, biaxially oriented polyethylene terephthalate (PET) film (3M #860092) to a level of 50% optical transmission as measured by a MacBeth ® model 110 optical densitometer, then knife coating a pressure-sensitive adhesive onto the aluminized surface of the film using a 5 mil orifice. The adhesive was dried 10 minutes in a forced-air oven at 150° F., yielding an adhesive coating weight of 8.0 grains per 24 sq.in. The adhesive was a 53% solids emulsion in water, and was prepared from the following ingredients in the amounts indicated:

87 wt. % isooctylacrylate
12 wt. % tertiary octylacrylamide
1 wt. % sodium styrene sulfonate The adhesive also contained 0.3 wt. % emulsifier ("Siponate DS-10", Alcolac Chemical Corp.). The concentration of emulsifier was based on the combined weight of the three ingredients listed.

Multi-layer composites were constructed by laminating one piece of aforementioned tape to the backing of another to form the desired number of layers. Test samples of the multi-layer composite structures were die-cut to 1 5/16 in. × 1 5/16 in. and adhered to the top major surface of a 2 in. × 2 in. × 3/16 in. polycarbonate block ("Lexan", General Electric Co.). An identical polycarbonate block was placed on top of the sample and the two blocks held together with three small rubber bands. Total mass of the two polycarbonate blocks was 26 grams. A 1/16 in. hole was drilled through the center of a side face of the lower block and extending to the center of the block to receive a Luxtron Fluoroptic ® probe to monitor the temperature of the block during the microwave heating test.

One-by-one, test samples were centered on the floor of a 0.8 cu. ft., 600 watt Sears Kenmore ® microwave oven (model 877-8500) while positioned in a foamed polystyrene container, constructed so as to provide ½ in. of polystyrene insulation around the sample with at least ¼ in. air gap around each face of the polycarbonate block. A foamed polystyrene cup containing 100 ml of room temperature tap water was placed on the floor of the oven in a rear corner to act as a dielectric load to protect the oven magnetron.

Figure 3:
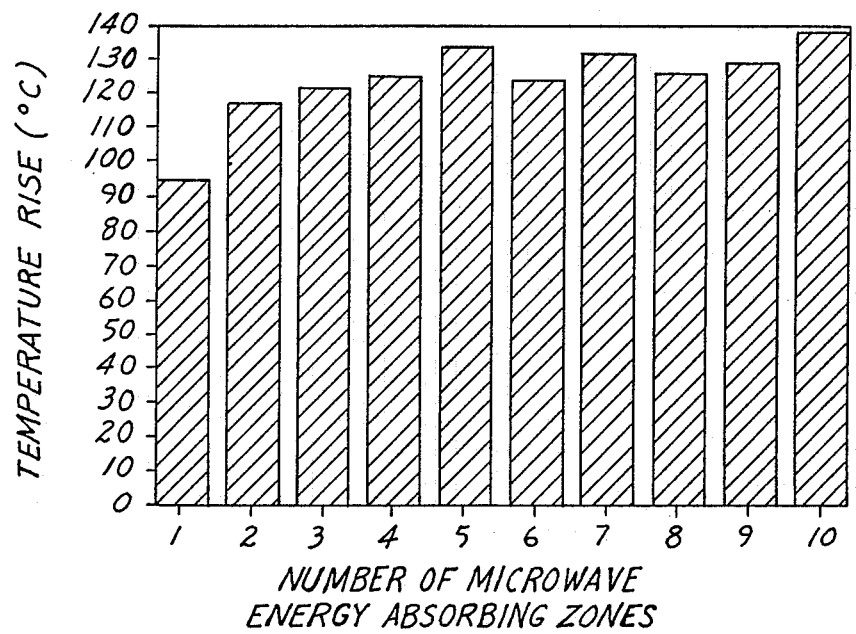
FIG. 3 is a graph depicting the level of temperature rise as a function of the number of microwave absorbing zones in the composite.

The microwave oven was operated at full power for one minute while the temperature of the lower block was monitored and recorded at ten second intervals. FIG. 3 shows the maximum temperature rise of the lower block during the test. It was observed that there was a net positive heat contribution resulting from each tape layer, up to four layers. Addition of layers in excess of four added little to heat contribution.

EXAMPLE 2

Tape was prepared as described in Example 1. Package samples were prepared using pouches, each 6½ in.×8 in. The pouches were prepared from 4.5 mil Scotchpak ® heat sealable polyester film (type 48). Each sample pouch was loaded with a single WypAll ® absorbent towel (Scott Paper Co.) and 100 milliliters of tap water, then heat sealed for four seconds with a Scotchpak ® Pouch Sealer, Model 9062.

Two types of vents were prepared: One had a 1 in.×1 in. single layer of tape and one had two superimposed layers of tape cut 1 in.×1 in. thereby forming a composite. To prepare the test samples, a single vent was located at the approximate geometric center of a package wall. The vent, called a perforating vent, formed a hole in the wall of the heat sealable film due to softening that portion of the film beneath it due to microwave heating. Steam generated internally perforates the wall in the location of the vent. This is in contrast to a seam vent, wherein the vent tape is placed over a specific section of a heat-sealed seam.

The pouches with vents were placed on the floor of a 0.8 cu. ft., 600 watt Sears Kenmore ® brand microwave oven (model 877-8500) and heated for three minutes at full power. Of the single layer vents, two of six samples vented properly, of the double layer vents, six of six samples vented properly. Proper venting means that package perforation occurred within the area of the tape, thus allowing sufficient continuous release of steam to prevent package seam blow-out or package explosion.

A single layer configuration of tape did not supply sufficient heat to reliably vent the packages, while a double layer configuration of tape did perform acceptably and reliably.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A microwave absorbing composite comprising at least two zones of material capable of absorbing microwave energy, said microwave energy absorbing zones consisting of one or more layers of electrically conductive material, each pair of said microwave energy absorbing zones being separated by a zone of material transparent to microwave energy, said microwave transparent zone consisting of one or more layers of electrically insulative material, and at least one layer of adhesive capable of bonding said composite to a substrate, said adhesive having sufficient mechanical strength to overcome any distortion forces so that said composite does not curl or slip relative to the substrate to which it is adhered as the composite heats in response to microwave energy, provided that said composite is incapable of arcing in a microwave oven whereof the maximum power output does not exceed 2000 watts of a frequency of 2.45 HHz.

2. The composite of claim 1 wherein said adhesive is a pressure-sensitive adhesive.

3. The composite of claim 1 wherein said adhesive is a silicone-based adhesive.

4. The composite of claim 1 wherein said adhesive is an acrylic-based adhesive.

5. The composite of claim 1 wherein said electrically conductive material comprises a metal.

6. The composite of claim 5 wherein said metal is a vacuum deposited metal.

7. The composite of claim 1 wherein said electrically conductive material comprises a metal oxide.

8. The composite of claim 1 wherein said electrically conductive material comprises a dispersion of electrically conductive materials in a binder.

9. The composite of claim 1 wherein said electrically insulative material comprises a polymer.

10. The composite of claim 9 wherein said polymer is in the form of an extruded polymeric film.

11. The composite of claim 1 wherein said zone of material transparent to microwave energy comprises paper.

12. The composite of claim 1 wherein there are up to ten zones of material capable of absorbing microwave energy.

13. A package having applied thereto the composite of claim 1.

14. The package of claim 13 wherein said composite is applied over a thermoplastic portion of said package.

15. The package of claim 13 wherein said composite is applied over a perforated portion of said package.

16. A microwave absorbing composite consisting of at least two zones of material capable of absorbing microwave energy, said microwave energy absorbing zones consisting of one or more layers of electrically conductive material, each pair of said microwave energy absorbing zones being separated by a zone of material transparent to microwave energy, said microwave transparent zone consisting of one or more layers of electrically insulative material, provided that said composite is incapable of arcing in a microwave oven whereof the maximum power output does not exceed 2000 watts at a frequency of 2.45 GHz.

17. The composite of claim 16 wherein said electrically conductive material comprises a metal.

18. The composite of claim 17 wherein said metal is a vacuum deposited metal.

19. The composite of claim 16 wherein said electrically conductive material comprises a metal oxide.

20. The composite of claim 16 wherein said electrically conductive material comprises a dispersion of electrically conductive materials in a binder.

21. The composite of claim 16 wherein said electrically insulative material comprises a polymer.

22. The composite of claim 21 wherein said polymer is in the form of an extruded polymeric film.

23. The composite of claim 16 wherein said zone of material transparent to microwave energy comprises paper.

24. The composite of claim 16 wherein there are up to ten zones of material capable of absorbing microwave energy.

* * * * *